United States Patent
Shankar et al.

(10) Patent No.: US 11,288,112 B1
(45) Date of Patent: Mar. 29, 2022

(54) ENFORCING DATA LOSS THRESHOLDS FOR PERFORMING UPDATES TO MIRRORED DATA SETS

(71) Applicant: Amazon Technologies, Inc., Seattle, WA (US)

(72) Inventors: Ramesh Shankar, Redmond, WA (US); Murali Brahmadesam, Redmond, WA (US); Raman Mittal, Seattle, WA (US); Grant Alexander MacDonald McAlister, Morro Bay, CA (US); Minsoo Oh, Seattle, WA (US); Yi Wen Wong, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 115 days.

(21) Appl. No.: 16/587,777

(22) Filed: Sep. 30, 2019

(51) Int. Cl.
*G06F 11/07* (2006.01)
*G06F 11/20* (2006.01)

(52) U.S. Cl.
CPC ........ *G06F 11/076* (2013.01); *G06F 11/0727* (2013.01); *G06F 11/2056* (2013.01)

(58) Field of Classification Search
CPC ............... G06F 11/076; G06F 11/0727; G06F 11/2056; G06F 11/2058; G06F 11/1456; G06F 11/1458; G06F 11/1464; G06F 16/27; G06F 16/273; G06F 16/275
See application file for complete search history.

(56) References Cited

U.S. PATENT DOCUMENTS

| 6,199,074 | B1 | 3/2001 | Kern et al. |
| 7,225,307 | B2 | 5/2007 | Micka et al. |
| 7,424,592 | B1 | 9/2008 | Karr et al. |
| 2005/0256972 | A1 | 11/2005 | Cochran et al. |
| 2009/0265518 | A1* | 10/2009 | McClure ............... G06F 16/273 711/162 |
| 2013/0138903 | A1* | 5/2013 | Matsui .................... G06F 3/065 711/162 |
| 2013/0166505 | A1* | 6/2013 | Peretz ................. G06F 11/2041 707/611 |
| 2014/0040206 | A1 | 2/2014 | Ramakrishnan et al. |
| 2014/0101100 | A1* | 4/2014 | Hu ....................... H04L 67/1002 707/617 |
| 2014/0208028 | A1* | 7/2014 | Coronado ............. G06F 3/0619 711/118 |
| 2014/0236891 | A1* | 8/2014 | Talius .................... G06F 11/00 707/613 |
| 2014/0297588 | A1* | 10/2014 | Babashetty ......... G06F 11/3027 707/613 |
| 2017/0177658 | A1 | 6/2017 | Lee et al. |
| 2017/0220424 | A1* | 8/2017 | Doshi ..................... G06F 16/27 |

(Continued)

*Primary Examiner* — Gabriel Chu
*Assistant Examiner* — Kurosu Risa Altaf
(74) *Attorney, Agent, or Firm* — Robert C. Kowert; Kowert, Hood, Munyon, Rankin & Goetzel, P.C.

(57) ABSTRACT

Data loss thresholds are enforced when performing updates to mirrored data sets. When an update is received for a data set that is mirrored to other copies of the data set, an evaluation of the difference between the data set and the other copies of the data set may be performed. If the evaluation determines that the difference fails to satisfy a threshold for acceptable data loss at the other copies upon a failure of the data set, a data loss mitigation action may be applied to performance of the update until the difference satisfies the threshold.

19 Claims, 9 Drawing Sheets

(56) References Cited

U.S. PATENT DOCUMENTS

2017/0344618 A1* 11/2017 Horowitz ............ G06F 11/2097
2018/0232412 A1    8/2018 Bensberg et al.
2018/0246928 A1    8/2018 Kim et al.
2020/0145480 A1*  5/2020 Sohail ................ H04L 67/1095

* cited by examiner

ENFORCING DATA LOSS THRESHOLDS FOR PERFORMING UPDATES TO MIRRORED DATA SETS

BACKGROUND

Distribution of various components of a software stack can, in some cases, provide (or support) fault tolerance (e.g., through replication), higher durability, and less expensive solutions (e.g., through the use of many smaller, less-expensive components rather than fewer large, expensive components). However, databases have historically been among the components of the software stack that are least amenable to distribution. For example, it can difficult to distribute databases while still ensuring the so-called ACID properties (e.g., Atomicity, Consistency, Isolation, and Durability) that they are expected to provide.

A copy of a database, such as a read replica, may be updated in order to scale out access to a database (e.g., read processing). For example, as changes are made to the structure of the database, a SQL record may be created in a logical replication log which may then be propagated to all the replicas. A database engine for a copy of the database would then run these SQL statements locally on the copy of the database. Replicating changes in this way, however, can increase the amount of time for replicating changes, allowing database copies to fall further behind the source database. Therefore, techniques that improve the performance of replicating database changes without incurring significant data loss in the event of a failure are highly desirable.

Figure 1:
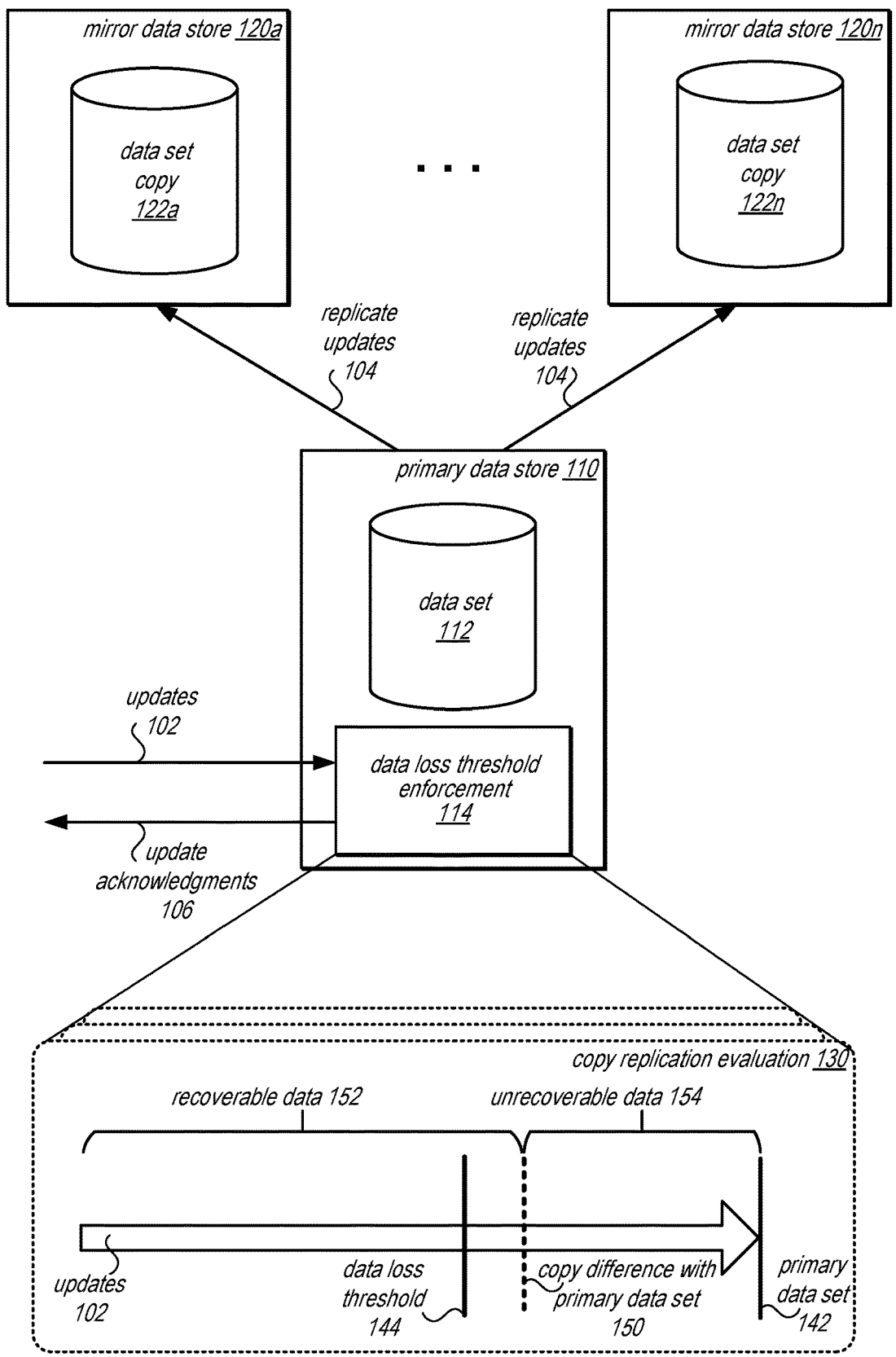
FIG. 1 is a logical block diagram illustrating enforcing data loss thresholds for performing updates to mirrored data sets, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Techniques for enforcing data loss thresholds for performing updates to mirrored data sets are described herein. Local replication techniques for a data set, such as quorum based replication, or other synchronous replication techniques may provide high availability for a data set in case of host failures. For example, a read-only copy of a database that is maintained synchronously with a primary copy of the database may become the primary copy in the event of primary copy host failure. To increase availability across larger distances, using different data store sites (e.g., across countries or continents), synchronous replication techniques may not be performant. Instead, mirroring techniques for data sets hosted in data stores, such as databases, may ensure high availability in case of site failures, in various embodiments. Unlike many synchronous replication techniques that rely upon a relatively common locality for different copies to achieve an acceptable performance level for a database, mirroring may be performed asynchronously (in order to maintain an acceptable performance level while still replicating updates across greater differences). As a result, a mirrored copy of a data set can be behind the primary copy of the data set (which is sometimes referred to as "mirror lag"). If the primary copy of the data set were to become unavailable, a mirrored data set could become the new primary (similar to the scenario mentioned above). However, mirror lag between the primary copy and the newly promoted primary copy may result in data loss—as the new primary copy may not be able to provide access to data changed during the mirror lag.

In various embodiments, enforcing data loss thresholds for performing updates to mirrored data sets may reduce data loss in such scenarios to within a threshold range. Instead of assuming an unknown data loss risk when relying upon mirrored data sets, a data loss threshold may be enforced to limit the mirror lag of a mirrored copy of the data set. Updates to a data set may not be completed until the mirror lag is within the data loss threshold, in some embodiments. In this way, client applications of a mirrored data set can balance availability needs with acceptable risk of losing data. Moreover, unacceptable or unknown data loss risk may be eliminated, giving client applications the ability to tune the performance of the mirrored data set to meet performance goals for client applications.

FIG. 1 is a logical block diagram illustrating enforcing data loss thresholds for performing updates to mirrored data sets, according to some embodiments. Primary data store 110 may be a database system, object-based storage system, file storage system, or other data store that stores a data set 112 on behalf of client applications. Data set 112 may be data, such as database tables, data objects, files, or other data items which may be updated and read in order to implement various aspects of client applications (e.g., a database table storing transaction records that are read to perform operations based on the transactions). In order to increases the availability of data set 112, mirror data stores, such as mirror data stores 120a through 120n, may store data set copies, such as data set copy 122a through 122n. Updates, such as updates 102 that are received for data set 112 may be replicated 104 to data set copies 122. Data set copies 122 may be accessed by submitting requests to read data to mirror data stores 120 (not illustrated). In at least some embodiments, data set copies 122 may not be modified by client requests (e.g., read-only copies), whereas data set 112 may be the only read-write copy.

To reduce mirror lag, primary data store 110 may implement data loss threshold enforcement 114, according to the various techniques discussed below with regard to FIGS. 4-8. For example, an evaluation of copy replications 130 (which may be performed for each copy, may identify a state of the primary data set 142 and a data loss threshold 144. The difference between the copy and the primary data set 150 may be determined, such as according to the various techniques discussed below with regard to FIGS. 6 and 8. This difference 144 may be compared with data loss threshold 144. Data loss threshold may be represented as a time difference or amount difference between a copy and the primary data set, in some embodiments. In some embodiments, the value of data loss threshold may be specified according to an interface and evaluated according to various specified policies or techniques, as discussed below with regard to FIG. 7. In some embodiments, multiple different thresholds may be utilized. For example, a maximum data loss threshold may be a service level agreement (SLA) or other performance guarantee that is strictly enforced so that a copy cannot be further behind than the maximum data loss threshold. In some embodiments, an additional data loss threshold value may be used to trigger data loss mitigation actions, such as blocking the performance of updates or slowing/delaying the rate of update performance to ensure that the difference 150 does not fail to satisfy the maximal data loss threshold. Note that as illustrated in FIG. 1, data loss threshold could represent either one of the exemplary data loss thresholds discussed above.

As illustrated in FIG. 1, the recoverable data 152 and the unrecoverable data 154 should the copy become a new primary data set may be indicated by the copy difference 150 with the primary data set 142. If the copy difference 150 were to not satisfy the data loss threshold 144, then at least some of unrecoverable data 154 would be outside the acceptable data loss threshold 144. When the copy difference fails 150 fails to satisfy the data loss threshold 144, data loss threshold enforcement 114 may apply a data loss mitigation action, such as throttling, delaying, dropping, queuing, or otherwise blocking the performance of updates to the primary data set 112. For instance, acknowledgements of updates 106 as committed may be queued, stored, held, suspended, or otherwise stopped until copy difference with primary data set 150 is within the data loss threshold 144 (even if the corresponding change to the data set is made to the primary data set 112 though not visible). In some embodiments, the update requests 102 may be blocked from performance entirely, without generating operations or tasks (e.g., including a logical sequence number (LSN) to perform the update). For updates not submitted by a client application, such as updates that are made by control planes or database management system features (e.g., implemented as part of a query engine to modify system data), the updates may still be performed and replicated even when the data loss threshold is not satisfied.

Please note, FIG. 1 is provided as a logical illustration of data stores, data sets, replication interactions, update interactions, data loss thresholds, and copy difference evaluation and is not intended to be limiting as to the physical arrangement, size, or number of components, modules, or devices to implement such features.

The specification first describes an example network-based database service that performs enforcing data loss thresholds for performing updates to mirrored databases. Included in the description of the example network-based database service are various aspects of the example network-based database service, such as a database engine head node, and a separate storage service. The specification then describes flowcharts of various embodiments of methods for enforcing data loss thresholds for performing updates to mirrored data sets. Next, the specification describes an example system that may implement the disclosed techniques. Various examples are provided throughout the specification.

Figure 2:
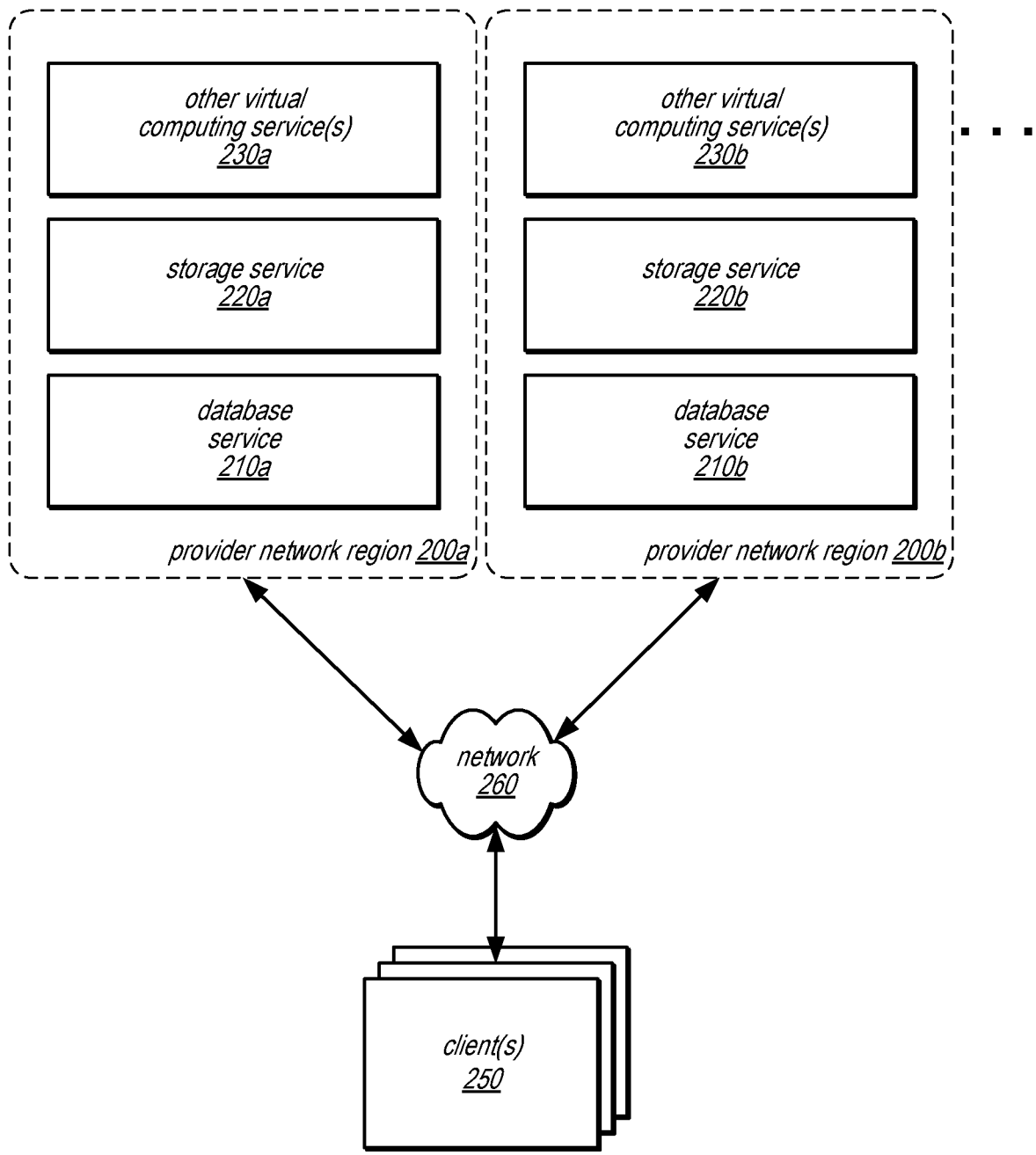
FIG. 2 is a block diagram illustrating provider network regions that may implement database services that implement enforcing data loss thresholds for performing updates to mirrored databases, according to some embodiments.

FIG. 2 is a block diagram illustrating provider network regions that may implement database services that implement enforcing data loss thresholds for performing updates to mirrored databases, according to some embodiments. A provider network may be a private or closed system or may be set up by an entity such as a company or a public sector organization to provide one or more services (such as various types of cloud-based storage) accessible via the Internet and/or other networks to clients 250, in some embodiments. The provider network may be implemented in a single location or may include numerous provider network regions, such as provider network regions 200a, 200b, and so on, that may include one or more data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network within the provider network regions 200.

Provider network regions 200 may, in some embodiments, be isolated from other provider network regions. In the illustrated embodiment, a number of clients (shown as clients 250 may interact with a provider network region 200 via a network 260. Provider network regions 200 may implement respective instantiations of the same (or different) services, a database services 210a and 210b, a storage services 220a and 220b and/or one or more other virtual computing services 230a and 230b. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with network-based services platform 200. In some embodiments, client 250 may generate network-based services requests according to a Representational State Transfer (REST)-style web services architecture, a document- or message-based network-based services architecture, or another suitable network-based services architecture.

In some embodiments, a client 250 (e.g., a database service client) may provide access to network-based storage of database tables to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network region 200 may be coordinated by client 250 and the operating system or file system on behalf of applications executing within the operating system environment.

Clients 250 may convey network-based services requests to and receive responses from provider network region 200 via network 260. In various embodiments, network 260 may encompass any suitable combination of networking hardware and protocols necessary to establish network-based communications between clients 250 and network-based platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network region 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with provider network region 200 using a private network rather than the public Internet. For example, clients 250 may be provisioned within the same enterprise as a database service system (e.g., a system that implements database service 210 and/or storage service 220). In such a case, clients 250 may communicate with platform 200 entirely through a private network 260 (e.g., a LAN or WAN that may use Internet-based communication protocols but which is not publicly accessible).

Generally speaking, provider network region 200 may implement one or more service endpoints may receive and process network-based services requests, such as requests to access data pages (or records thereof). For example, provider network region 200 may include hardware and/or software may implement a particular endpoint, such that an HTTP-based network-based services request directed to that endpoint is properly received and processed. In one embodiment, provider network region 200 may be implemented as a server system may receive network-based services requests from clients 250 and to forward them to components of a system that implements database service 210, storage service 220 and/or another virtual computing service 230 for processing. In other embodiments, provider network region 200 may be configured as a number of distinct systems (e.g., in a cluster topology) implementing load balancing and other request management features may dynamically manage large-scale network-based services request processing loads. In various embodiments, provider network region 200 may be may support REST-style or document-based (e.g., SOAP-based) types of network-based services requests.

In addition to functioning as an addressable endpoint for clients' network-based services requests, in some embodiments, provider network region 200 may implement various client management features. For example, provider network region 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network region 200 may also implement financial accounting and billing systems, or may maintain a database of usage data that may be queried and processed by external systems for reporting and billing of client usage activity. In certain embodiments, provider network region 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network region 200 may also implement user authentication and access control procedures. For example, for a given network-based services request to access a particular database table, provider network region 200 ascertain whether the client 250 associated with the request is authorized to access the particular database table. Provider network region 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region 200 to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region 200 may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Database service 210 may implement one or more different types of database systems with respective types of query engines for accessing database data as part of the database. In the example database system implemented as part of database service 210, a database engine head node 310 may be implemented for each of several databases and a log-structured storage service 350 (which may or may not be visible to the clients of the database system). Clients of a database may access a database head node 310 (which may be implemented in or representative of a database instance) via network utilizing various database access protocols (e.g., Java Database Connectivity (JDBC) or Open Database Connectivity (ODBC)). However, log-structured storage service 350, which may be employed by the database system to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, log-structured storage service 350 may perform various storage, access, change logging, recovery, log record manipulation, and/or space management operations in a manner that is invisible to clients of a database engine head node 310.

As previously noted, a database instance may include a single database engine head node 310 that implements a query engine 320 that receives requests, like request 312, which may include queries or other requests such as updates, deletions, etc., from various client programs (e.g., applications) and/or subscribers (users), then parses them, optimizes them, and develops a plan to carry out the associated database operation(s). Query engine 320 may return a response 314 to the request (e.g., results to a query) to a database client, which may include write acknowledgements, requested data pages (or portions thereof), error messages, and or other responses, as appropriate. As illustrated in this example, database engine head node 310 may also include a storage service engine 330 (or client-side driver), which may route read requests and/or redo log records to various storage nodes within log-structured storage service 350, receive write acknowledgements from log-structured storage service 350, receive requested data pages from log-structured storage service 350, and/or return data pages, error messages, or other responses to query engine 320 (which may, in turn, return them to a database client).

In this example, query engine 320 or another database system management component implemented at database engine head node 310 (not illustrated) may manage a data page cache, in which data pages that were recently accessed may be temporarily held. Query engine 320 may be responsible for providing transactionality and consistency in the database instance of which database engine head node 310 is a component. For example, this component may be responsible for ensuring the Atomicity, Consistency, and Isolation properties of the database instance and the transactions that are directed that the database instance, such as determining a consistent view of the database applicable for a query, applying undo log records to generate prior versions of tuples of a database. Query engine 320 may manage an undo log to track the status of various transactions and roll back any locally cached results of transactions that do not commit.

Figure 3:
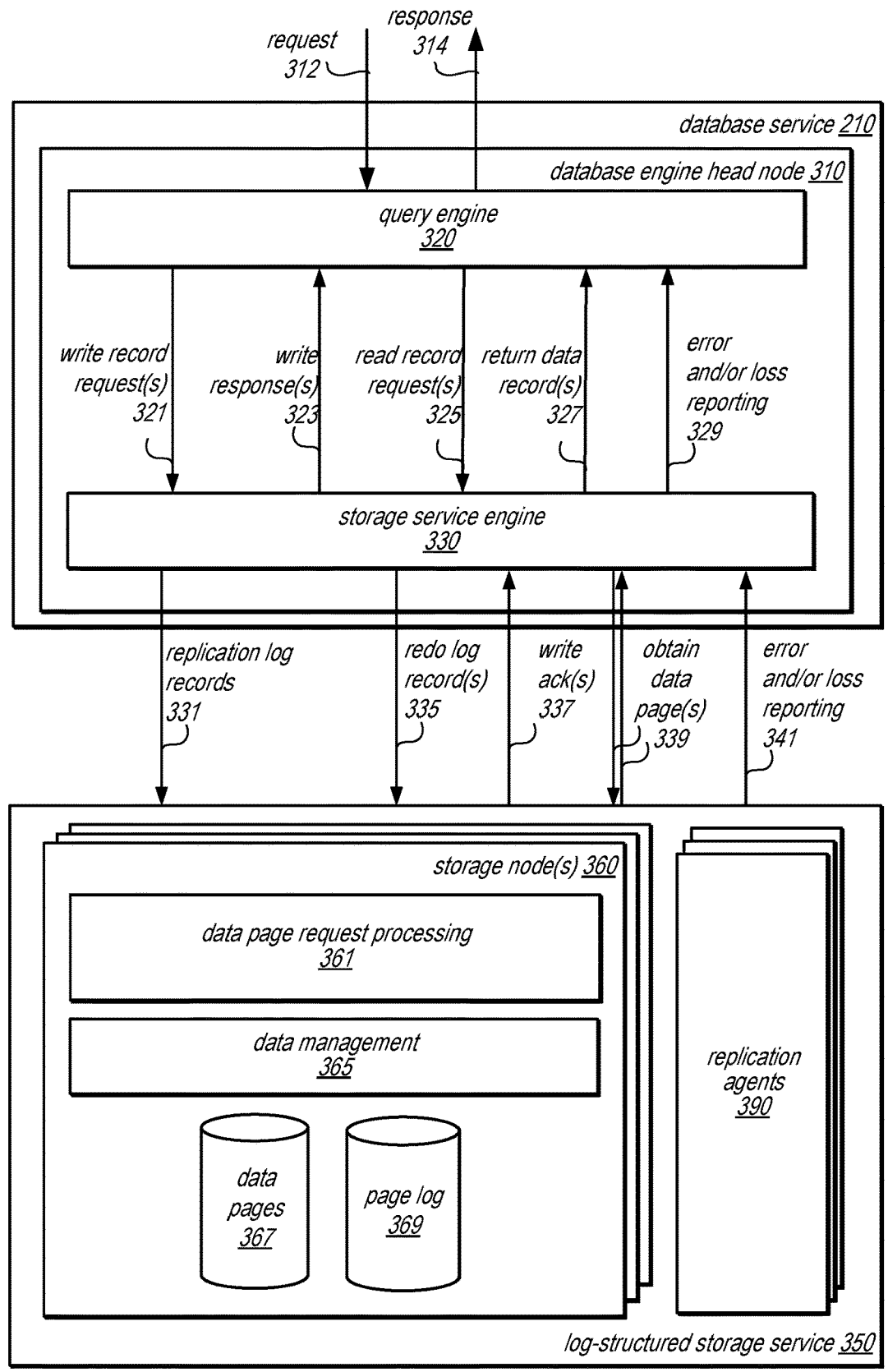
FIG. 3 is a block diagram illustrating various components of a database service and storage service hosted in another provider network region, according to some embodiments.

FIG. 3 illustrates various interactions to perform various requests, like request 312. For example, a request 312 that includes a request to write to a page may be parsed and optimized to generate one or more write record requests 321, which may be sent to storage service engine 330 for subsequent routing to log-structured storage service 350. In this example, storage service engine 330 may generate one or more redo log records 335 corresponding to each write record request 321, and may send them to specific ones of the storage nodes 360 of log-structured storage service 350. Log-structured storage service 350 may return a corresponding write acknowledgement 337 for each redo log record 335 (or batch of redo log records) to database engine head node 310 (specifically to storage service engine 330). Storage service engine 330 may pass these write acknowledgements to query engine 320 (as write responses 323), which may then send corresponding responses (e.g., write acknowledgements) to one or more clients as a response 314.

In another example, a request that is a query may cause data pages to be read and returned to query engine 320 for evaluation and processing or a request to perform query processing at log-structured storage service 350 may be performed. For example, a query could cause one or more read record requests 325, which may be sent to storage service engine 330 for subsequent routing to log-structured storage service 350. In this example, storage service engine 330 may send these requests to specific ones of the storage nodes 360 of log-structured storage service 350, and log-structured storage service 350 may return the requested data pages 339 to database engine head node 310 (specifically to storage service engine 330). Storage service engine 330 may send the returned data pages to query engine 320 as return data records 327, and query engine may then evaluate the content of the data pages in order to determine or generate a result of a query sent as a response 314. As discussed below with regard to FIG. 4, some requests to store replication log records 331 may be performed as part of performing replication log techniques (e.g., to amortize the transmission of replication records to a replication log).

In some embodiments, various error and/or data loss messages 341 may be sent from log-structured storage service 350 to database engine head node 310 (specifically to storage service engine 330). These messages may be passed from storage service engine 330 to query engine 320 as error and/or loss reporting messages 329, and then to one or more clients as a response 314.

In some embodiments, the APIs 331-341 of log-structured storage service 350 and the APIs 321-329 of storage service engine 330 may expose the functionality of the log-structured storage service 350 to database engine head node 310 as if database engine head node 310 were a client of log-structured storage service 350. For example, database engine head node 310 (through storage service engine 330) may write redo log records or request data pages through these APIs to perform (or facilitate the performance of) various operations of the database system implemented by the combination of database engine head node 310 and log-structured storage service 350 (e.g., storage, access, change logging, recovery, and/or space management operations).

Note that in various embodiments, the API calls and responses between database engine head node 310 and log-structured storage service 350 (e.g., APIs 321-329) and/or the API calls and responses between storage service engine 330 and query engine 320 (e.g., APIs 331-341) in FIG. 3 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine head node 310 and/or log-structured storage service 350.

In some embodiments, database data for a database of database service 210 may be organized in various logical volumes, segments, and pages for storage on one or more storage nodes 360 of log-structured storage service 350. For example, in some embodiments, each database may be represented by a logical volume, and each logical volume may be segmented over a collection of storage nodes 360. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

As discussed above, log-structured storage service 350 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Replication agents 390, discussed in detail below with regard to FIGS. 4 and 5, may be implemented as part of log-structured storage service 350 or other storage service, as discussed above. In some embodiments, log-structured storage service 350 may be multi-tenant storing data for different databases hosted on behalf of different user accounts (e.g., owned, operated, managed by different entities) by sharing resources at storage nodes, in some embodiments. Some replication agent(s) 390 may perform the below replication techniques for multiple different databases for different user accounts, in some embodiments.

Figure 4:
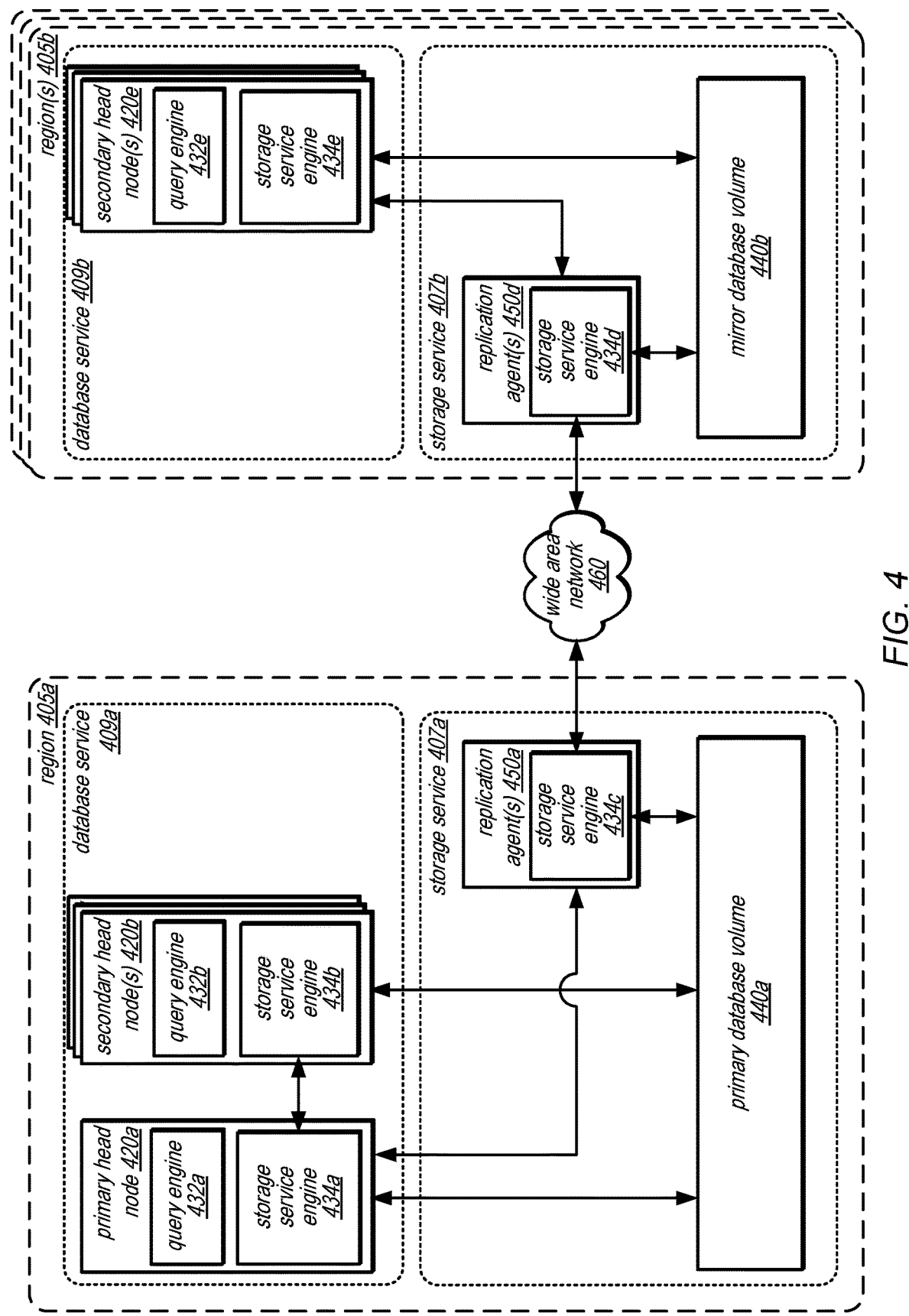
FIG. 4 is a block diagram illustrating various components of a database service that implement replication to mirrored databases, according to some embodiments.

FIG. 4 is a block diagram illustrating various components of a database service that implement replication to mirrored databases, according to some embodiments. Various ones of the components illustrated in FIG. 4 may be implemented via various computer systems (e.g., such as the computer system illustrated in FIG. 9, described below).

In this illustrated example, multiple clusters of one or more database engine head nodes may be hosted in respective services in database services 409a and 409b in region 405a and region(s) 405b to provides database services to clients that access the databases in the different regions. It should be noted that, while the illustrated example shows one remote cluster, any number of remote clusters may be employed. Similarly, one or multiple head nodes may be implemented within each database service for a database, in some embodiments Multiple head nodes, as discussed above with regard to FIGS. 2-3, such as primary head node 420a and secondary head node(s) 420b may be implemented as part of database service 409a to provide access to a database stored in storage service 407a, in primary database volume 440a. Primary head node 420 may provide read and write capabilities to the database, utilizing database tier 432a and client-side storage service driver 434a, as well as offering additional read capacity via secondary head node(s) 420b, which includes a respective database tier 432b and client-side storage service driver 434b.

Storage service 407a may also implement a replication agent(s) 450a which may act as a reverse proxy, among other features, to replicate changes made to the database at primary database volume 440a to a mirror database volume 440b stored in storage service 407b in region 405b. Note that other regions may also implement mirror database volumes in respective storage services. Replication agent(s) 450a may implement a client-side storage service driver 434c to perform the various techniques discussed below with regard to FIGS. 5-9. Similarly, storage service 407(b) may implement replication agent(s) 440d, which may include client-side storage service 434d to perform the below replication techniques while minimizing the time that mirror database volume is unable to be accessed by secondary head node 420e (via database tier 432e and client-side storage service driver 434e), in some embodiments. In some embodiments, multiple replication agents may be assigned to replicating changes to database copies (e.g., 2 replication agents for source database and database copy).

In some embodiments, client-side storage service drivers 434 may implement a one or more streams of information to assist in synchronizing updates between database volumes and head nodes. For example, client-side driver 434a may send change notifications of cache invalidation messages, and/or changes to system metadata, such as data structures that indicate the layout and/or definition of the database and/or in-flight transaction data, such as the states of and entries of active transactions at primary node 420a) to client-side driver 434b of replica node 420b as well as to client-side driver 434c of replication agent 450a. Replication agent(s) 450a can function as an additional replica node of the database in database service 409a, in some embodiments. Replication agent 450 may forward the change notifications received from the client-side driver 434a to the client-side driver 434d of the replication agent 450d over wide area network 460 (which may be a public network, in some embodiments) where the replication agent 450d may function as single writer for mirror database volume 440b. In this way, performance of the database in database service 409a is minimally degraded yet the access to mirror database volume 440b can provide a consistent read view of the database with minimal latency, in some embodiments. Note, in other embodiments, another network, including one or multiple private networks or semi-private networks may be implemented to connect regions 405 in other embodiments.

As the communications between replication agents may occur over wide area network 460, various security protocols may be implemented, in some embodiments. For example, SSL or other TLS security techniques may be implemented to safeguard or otherwise encrypt data being transmitted over wide area network 460 (e.g., log records or pages as discussed below).

Figure 5:
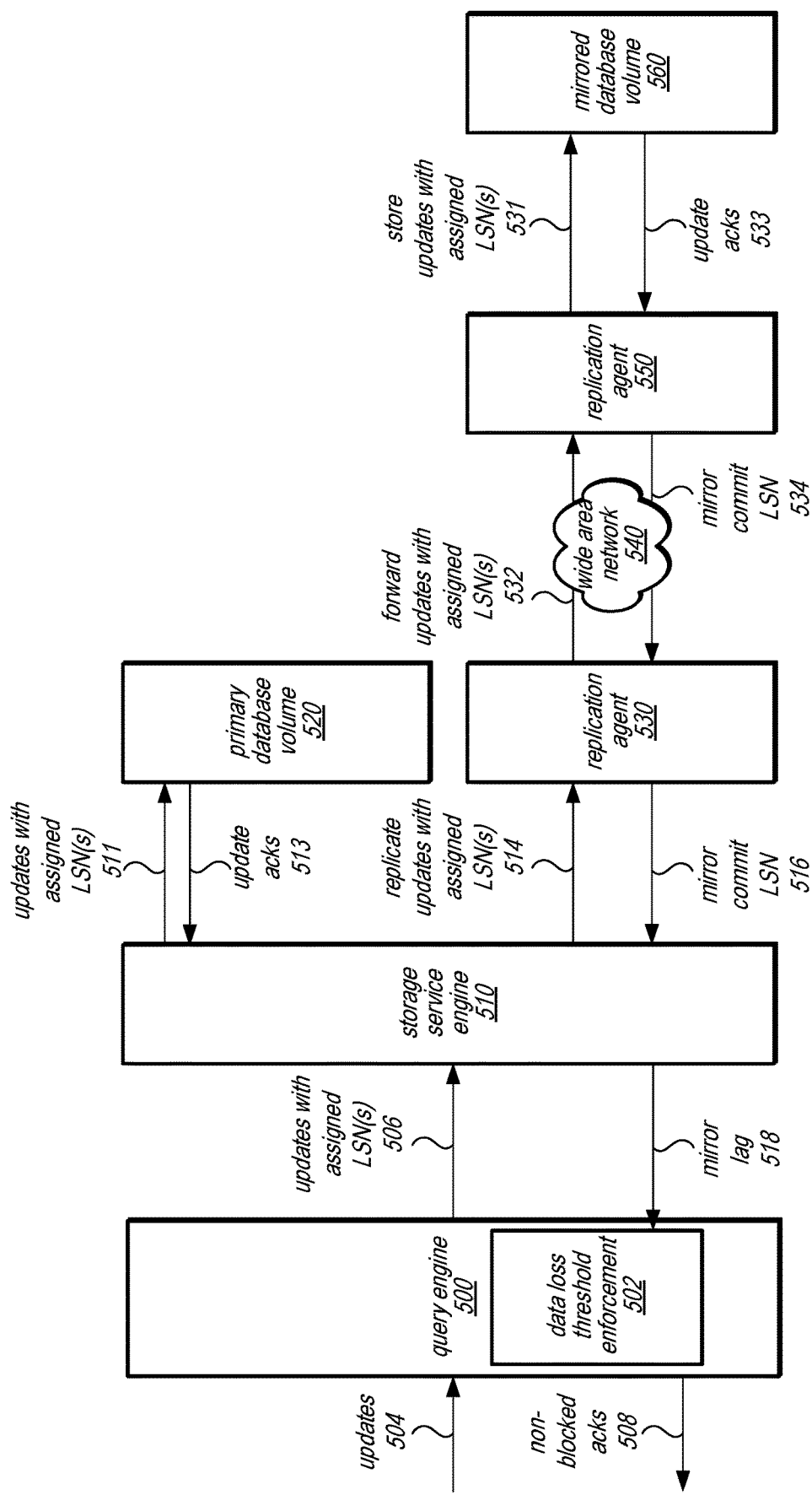
FIG. 5 is a logical block diagram illustrating interactions that enforce data loss thresholds, according to some embodiments.

FIG. 5 is a logical block diagram illustrating interactions that enforce data loss thresholds, according to some embodiments. Updates 504 (e.g., client-submitted transaction commit requests, client-submitted writes, or other client-submitted changes) may be received at a query engine 500. Query engine 500 may implement data loss threshold enforcement 502, which may check to see whether updates the data loss threshold is satisfied. For instance, as discussed in detail below with regard to FIG. 6, different techniques for generating the difference between the primary copy and mirrored cop(ies) may be performed. Different evaluations may be performed for each mirrored copy, in some embodiments. As discussed below with regard to FIG. 7, the loss thresholds and evaluations may be specified individually so that a difference value for one mirrored copy may not satisfy its own threshold but would satisfy the threshold of another mirrored copy. Different thresholds may trigger different data loss mitigation actions, in some embodiments. In some embodiments, a user-specified (e.g., via an interface command in FIG. 7) maximum data loss threshold may be enforced so that no update is allowed that would cause a mirrored copy to suffer greater data loss than the maximum data loss threshold. Query engine 500 may queue, store, delay, throttle, block or otherwise hold updates and may perform them if the difference between mirrored copies and the primary copy satisfies the data loss threshold.

As noted above with regard to FIGS. 3 and 4, updates to a copy may be indicated in a change log, such as by redo log records. An LSN may be assigned to the updates by query engine 506. The assigned LSN may be used to determine the difference between the primary copy and mirrored copies, in some embodiments. For instance, updates with assigned LSN(s) may be provided to storage service engine 510, which may issue requests 511 to perform the updates with assigned LSN(s) to primary database volume 520, receiving update acknowledgments 513 in return. Storage service engine 510 may also send requests 514 to replicate the updates with assigned LSN(s) to a replication agent 530. Replication agent 530 may then forward the updates via wide area network 540 with the assigned LSN(s) 532 to replication agent 550 which may store 531 the updates with assigned LSN(s) to mirrored database volume 560, receiving update acknowledgments 533 in return. Replication agent 550 may indicate a state of the mirrored database volume 560 by returning a mirror commit LSN 534 to replication agent 530 via wide area network 540, which in turn may provide the mirror commit LSN 516 to storage service engine 510.

Storage service engine 510 may determine the mirror lag based on the mirror commit LSN, assigned LSN(s) to updates 506, and timestamps or other information provided by query engine 500. Storage service engine may return the mirror lag 518 to query engine, which may be used by data loss threshold for evaluating whether performance of requests should be blocked or proceed.

Figure 6:
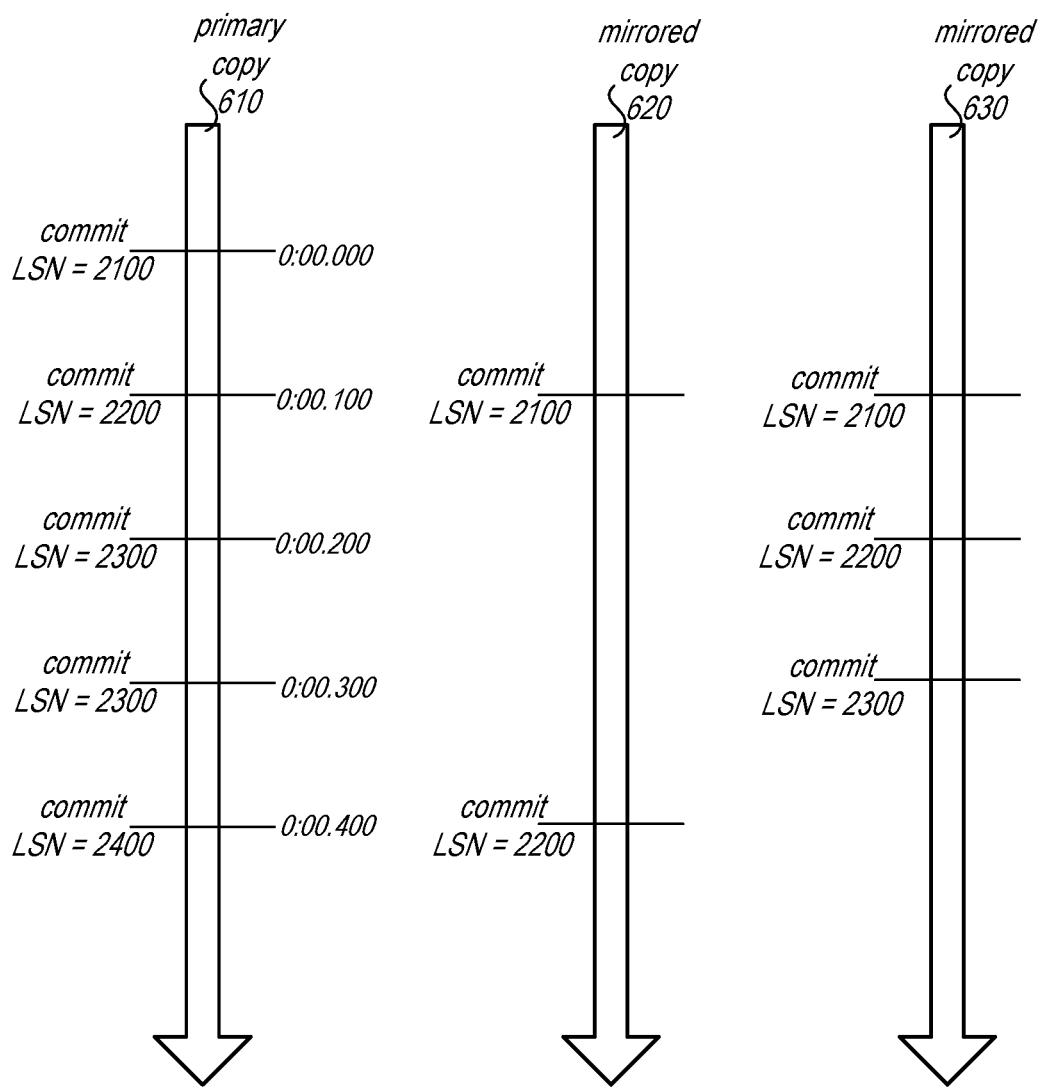
FIG. 6 is a logical block diagram illustrating an example mirror lag determination for comparison with a data loss threshold, according to some embodiments.

Various different techniques may be implemented for determining a difference between a primary copy and mirrored copies of a data set. FIG. 6 is a logical block diagram illustrating an example mirror lag determination for comparison with a data loss threshold, according to some embodiments. For example, primary copy 610 may have committed different updates with LSN value 2100 at time stamp "0:00.000", LSN value 2200 at time stamp "0:00.100", LSN value 2300 at time stamp "0:00.200", LSN value 2400 at time stamp "0:00.300", and LSN value 2500 at time stamp "0:00.400." For the different mirrored copies, 620 and 630, indications may be received at the primary copy 610 (e.g., at a storage service engine or query engine for the primary copy 610), of the completion of the updates.

As illustrated in FIG. 6, commit LSN 2100 at mirrored copies 620 and 630 is associated with timestamp "0:00.100." The mirror lag for each mirror may then be determined using the primary copy's timestamp values associated with the commit same LSNs. For example, if commit LSN 2100 has a timestamp of "0:00.000" at the primary copy 610, the timestamp value of commit LSN 2100 for the other mirrored copies may subtract the original commit timestamp to determine lag (e.g., 0:00.100-0:00.000=0:00.100 lag for both mirrored copies 620 and 630). Not all mirrored copies may perform and return updates at the same time. For instance, the lag for mirrored copy 620 is larger than the lag for mirrored copy 630 (e.g., the lag for mirrored copy 620 may be determined based on commit LSN 2200, where 0:00.400-0:00.100=0:00.300 lag). The determined lag values may then be compared with a data loss threshold, which is also represented as a time value (e.g., 0:00.200, which would indicate that mirrored copy 620 exceeds the data loss threshold).

In some embodiments, some LSNs for some operations may be ignored. For example, a synthetic write transaction (e.g., to perform a system operation) may not be compared for the sake of determining the mirror lag. Other techniques for determining the mirror lag or difference may be implemented, as discussed below with regard to FIG. 8.

Figure 7:
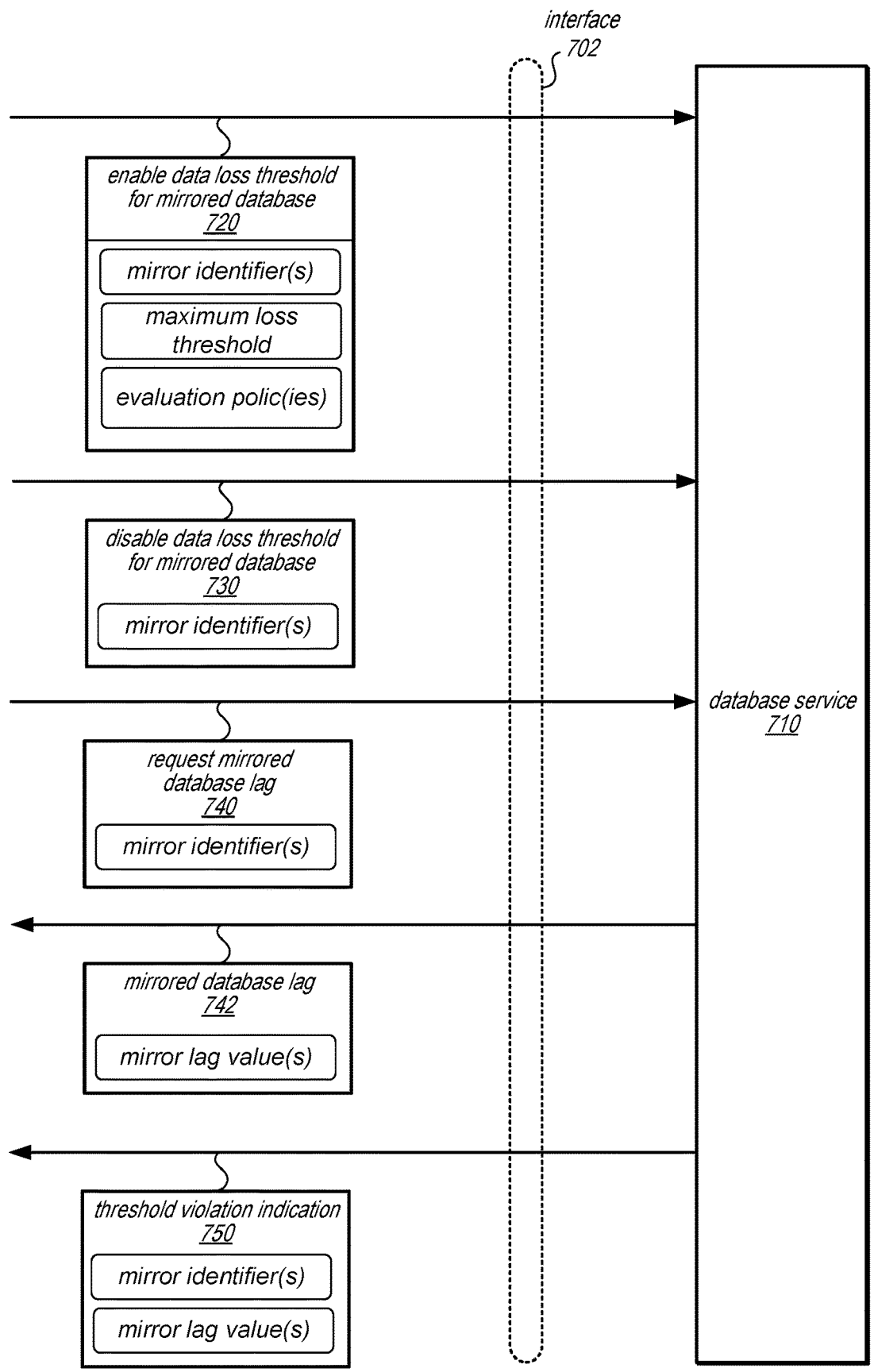
FIG. 7 is a logical block diagram illustrating various interactions for enforcing data loss thresholds via a database service interface, according to some embodiments.

FIG. 7 is a logical block diagram illustrating various interactions for enforcing data loss thresholds via a database service interface, according to some embodiments. Database service 710 (which may be similar to database service 210 in FIG. 2) may implement an interface 702, which may be a programmatic interface (e.g., one or more Application Programming Interface(s) (APIs), graphical user interface (GUI), and/or command line interface (CLI). A user can submit a request to enable data loss threshold enforcement for a mirrored database, as indicated at 720 via interface 702. The enablement request 720 may include identifiers for one or more mirrored databases to enable the enforcement. Note that in some embodiments, one mirror may be enabled and one mirror may not be enabled so that mirror lag for the non-enabled threshold is not considered or used to block performance of update requests. In some embodiments, a same data loss threshold may be specified for each mirrored database or different data loss thresholds may be specified for one or more mirrored databases. An evaluation policy may be specified for loss thresholds and may identify/configure data loss mitigation actions. For instance, the evaluation policy may specify that if the loss threshold is met or exceed for any one mirrored copy then, updates are blocked. Or, in another example, multiple data loss thresholds indicating varying degrees of data mitigation actions (e.g., throttling 20%, then 50%, then 80% of updates) may be specified for evaluation for one or multiple copies. In a further example of an evaluation policy, any number of data loss threshold violations may be tolerated (and thus not block updates) if X number of mirrored copies are within their respective data loss thresholds. In at least some embodiments, a maximum data loss threshold may be specified, which may be the acceptable data loss threshold that is evaluated (or used to determine other data loss thresholds for triggering data mitigation actions).

As indicated at 730, a request may be submitted to disable data loss threshold enforcement for a mirrored database via interface 702. For example, a mirrored copy that would not logistically be used as a failover copy (e.g., due to a large distance from the client applications utilizing the database) may be disabled for enforcement by a mirror identifier that identifies the mirrored copy. Other copies of the database may still have data loss thresholds enforced even the data loss threshold is disabled according to a request 730, in some embodiments.

Statistics as to the performance of different mirrored database copies may be provided. For example, a chart, graph, status board, or other indication of mirror database lag may be provided (e.g., via a GUI version of interface 702). In some embodiments, a client application may specifically request the lag 740 for an identified mirrored copy. Database service 710 may returned the mirrored database lag 742 with lag values via interface 702 responsive to request 740.

In some embodiments, threshold violation indications 750 may be provided to a control system, messaging system, or other specified recipient (e.g., by a configuration request for the indication—not illustrated). The violation indication 750 may specify the mirror via a mirror identifier and mirror lag value.

Figure 8:
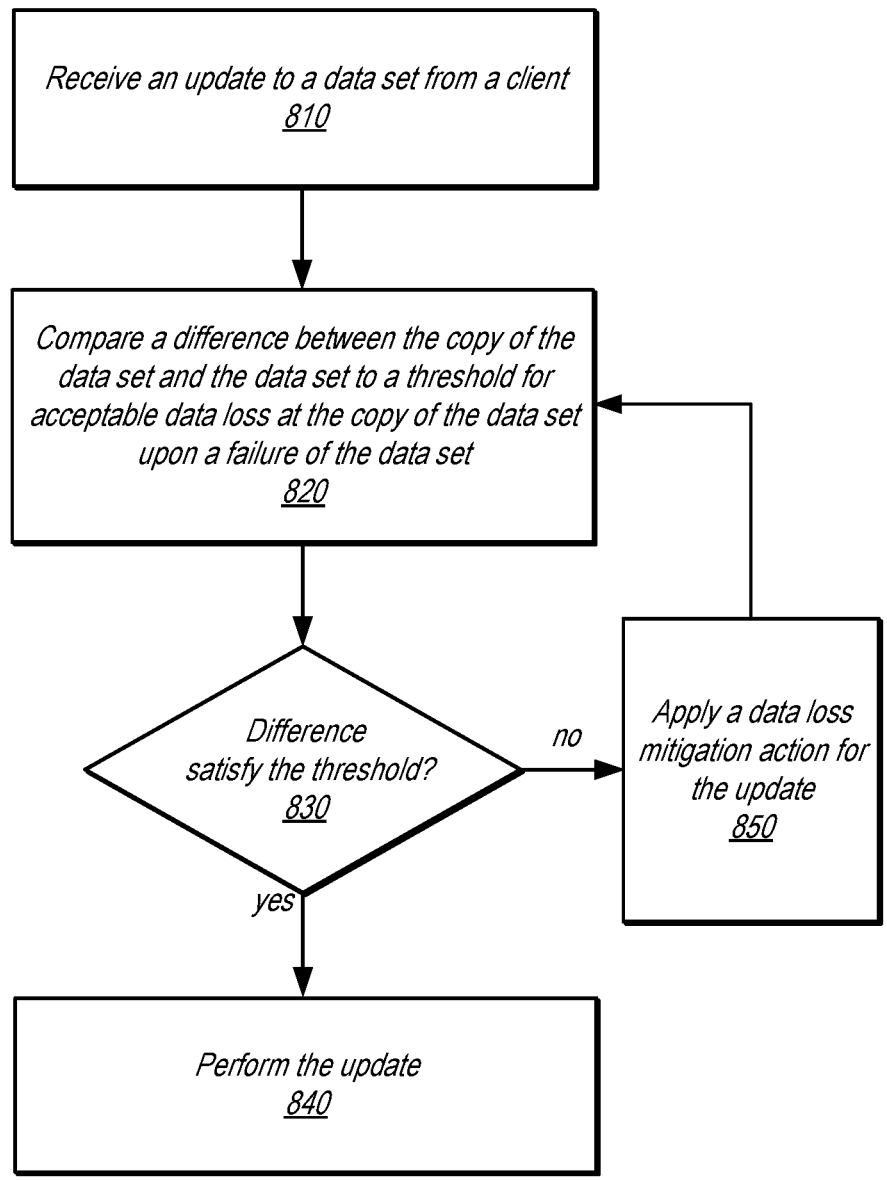
FIG. 8 is a high-level flowchart illustrating various methods and techniques to implement enforcing data loss thresholds for performing updates to mirrored data sets, according to some embodiments.

The database service and storage service discussed in FIGS. 2 through 7 provide examples of a system that may implement enforcing data loss thresholds for performing updates to mirrored data sets. However, various other types of data stores (e.g., non-log structured) or other storage engines may implement enforcing data loss thresholds for performing updates to mirrored data sets. FIG. 8 is a high-level flowchart illustrating various methods and techniques to implement enforcing data loss thresholds for performing updates to mirrored data sets, according to some embodiments. Various different systems and devices may implement the various methods and techniques described below, either singly or working together. For example, a replication agent, database engine head node or storage node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 810, an update to a data set may be received from a client. In some embodiments, the updates may be requests to perform individual writes (e.g., a write transaction). In some embodiments, the updates may be requests to commit transactions to the data set (e.g., committing a proceeding number of writes). In some embodiments, updates may be individual write requests (e.g., singleton writes) to, for instance, insert, modify, or delete an individual item (or portion thereof, such as a column value). In some embodiments, updates may be updates to a schema for the data set (e.g., updates to a column type, adding a column, removing a column, etc.).

As indicated at 820, a comparison of a difference between the copy of the data set and the data set may be made to a threshold for acceptable data loss at the copy of the data set may be made. The threshold for acceptable data loss at the copy of the data set may be data loss that would occur upon a failure of the data set, in various embodiments. The difference may be determined using different techniques. For example, the difference between synchronized clock time values for when a same update is made to a primary data set and a mirrored data set can be determined. In some embodiments, the difference may be determined by a state indication of the primary data set and copies. A log, for instance, that describes the changes to or state of the primary data set and copies may be compared by comparing a logical sequence number LSN completion point for the primary data set and copies. The difference between the LSN completion points may indicate the difference between the copies (e.g., the mirror lag). As discussed above with regard to FIG. 6, timestamp values for particular committed updates as determined by the primary data set (e.g., timestamp from the prospective the data store that hosts the primary data set so that time values do not have to be synchronized) may be compared to determine the difference. In some embodiment, difference heuristics may be implemented to estimate the difference (e.g., the rate at which the metadata that tracks updates to copies and the primary data set is updated, for instance). In some embodiments, linear interpolation or other statistical evaluations may be performed to determine from the timestamps and LSN values of updates to the primary data set and copies what the difference between the copies is.

Various types of difference values may be compared according to corresponding types of thresholds to determine whether the threshold is satisfied. For instance, if the threshold is specified according to time (e.g., a 5 minute threshold), then the comparison may evaluate whether the time different is greater than or equal to 5 minutes. If, in another example, the threshold is specified according to an amount of data changes (e.g., 5 MBs), then the comparison may evaluate whether the difference amount is greater than or equal to 5 MBs. The threshold may be the maximum acceptable data loss threshold, in some embodiments, or may be another acceptable data loss threshold less than the maximum acceptable data loss threshold, in other embodiments (e.g., in order to utilize different data loss thresholds to trigger different types data loss mitigation actions).

If the difference fails to satisfy the threshold, as indicated by the negative exit from 830, then performance of the update may be blocked, or some other data loss mitigation applied, as indicated at 850. If the difference satisfies the threshold, then the update may be performed, as indicated at 840.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
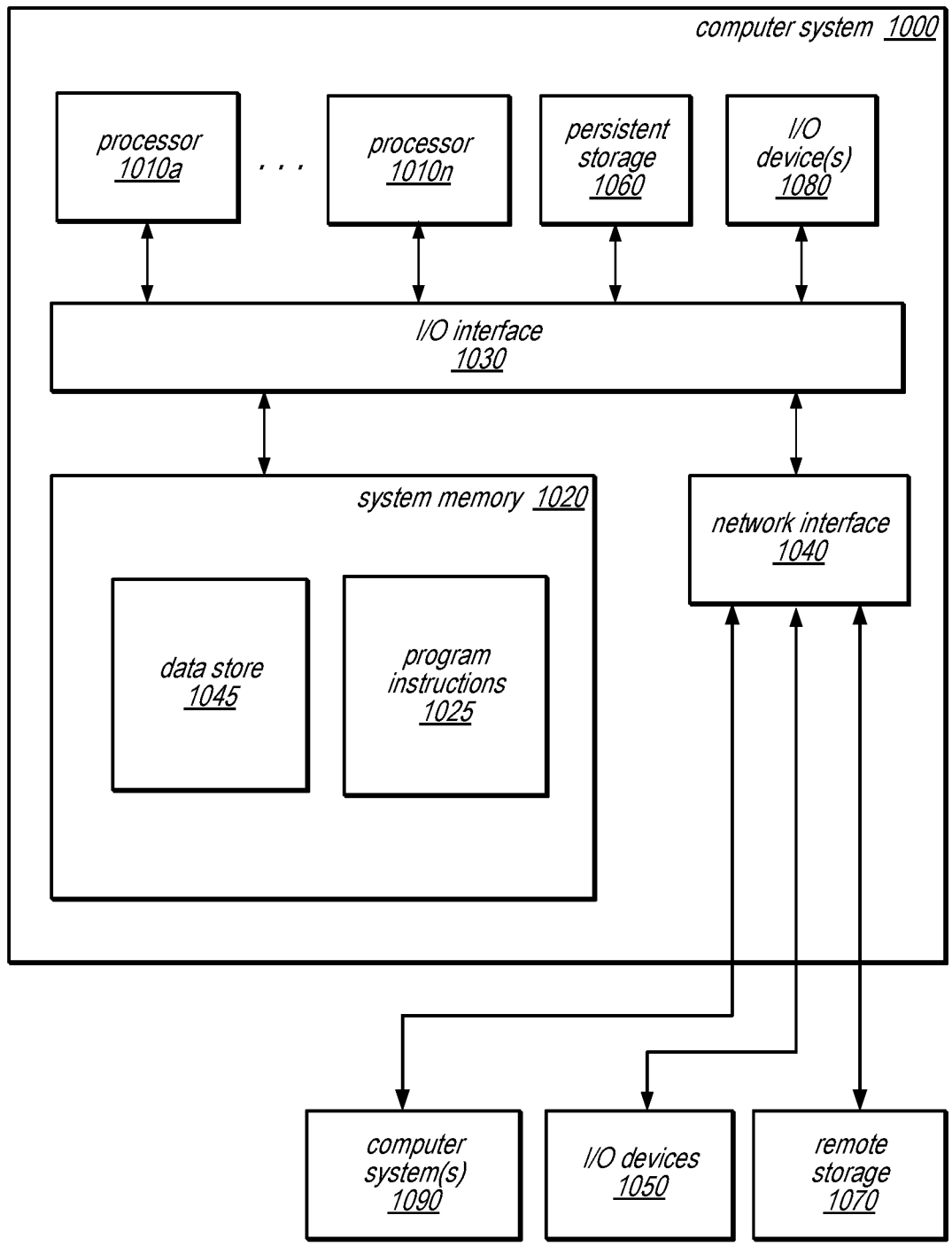
FIG. 9 is a block diagram illustrating an example computer system, according to various embodiments.

FIG. 9 is a block diagram illustrating an example computer system, according to various embodiments. For example, computer system 1000 may implement a read-write (or master/leader/primary) node of a database tier, a read-only node (or read replica/secondary node), replication agents, or one of a plurality of storage nodes of a separate distributed storage system that stores database tables and associated metadata on behalf of clients of the database tier, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor cause the at least one processor to implement a database service, the database service configured to:
      receive an update to a primary database from a client, wherein updates to the primary database are replicated to one or more copies that mirror the primary database;
      compare a mirror lag between the one or more copies of the database and the primary database with a threshold, wherein the threshold is for acceptable data loss at the one or more copies of the database upon a failure of the primary database;
      determine from the comparison that the mirror lag fails to satisfy the threshold;
      responsive to the determination that the mirror lag fails to satisfy the threshold, apply a data loss mitigation action to the update to the primary database until the mirror lag is within the threshold; and
      receive a request, from the client subsequent to the applying the data loss mitigation action, that disables enforcement of the threshold with respect to at least one of the one or more copies that mirror the primary database.

2. The system of claim 1, wherein the updates to the primary database are replicated to a further copy that mirrors the primary database, and wherein the database service is further configured to determine that a mirror lag between the further copy of the primary database and the primary database satisfies a threshold for acceptable data loss at the further copy upon a failure of the primary database, wherein the threshold acceptable for the data loss at the further copy is the same as the threshold for acceptable the data loss at the one or more copies.

3. The system of claim 1, wherein the database service is further configured to:
   receive an update to the primary database that is not submitted by a client application of the database service when the mirror lag fails to satisfy the threshold; and
   allow performance of the update to the primary database that is not submitted by the client application.

4. The system of claim 1, wherein the database service is implemented as part of a provider network that offers different provider network regions, wherein the one or more copies of the primary database are located in a different respective provider network region than the primary database, wherein the updates to the one or more copies are replicated via a wide area network that connects the different respective provider network regions.

5. A method, comprising:
   receiving an update to a data set, wherein updates to the data set are replicated to one or more copies that mirror the data set;
   determining that a difference between the one or more copies of the data set and the data set fails to satisfy a threshold for acceptable data loss at the one or more copies of the data set upon a failure of the data set;
   responsive to the determining that the difference fails to satisfy the threshold, applying a data loss mitigation action to the update to the data set; and
   receiving a request, subsequent to applying the data loss mitigation action via an interface for a data store that hosts the data set, that disables enforcement of the threshold with respect to at least one of the one or more copies.

6. The method of claim 5, further comprising:
   after applying the data loss mitigation action, determining that a difference between the one or more copies of the data set and the data set is within the threshold; and
   responsive to determining that the difference between the one or more copies of the data set and the data set is within the threshold, performing the update to the data set.

7. The method of claim 5, further comprising:
   receiving an update to the data set that is not submitted by a client application of a data store that hosts the data set when the difference fails to satisfy the threshold; and
   allowing performance of the update to the data set that is not submitted by the client.

8. The method of claim 5, wherein the updates to the data set are replicated to a further copy that mirrors the data set, and wherein the method comprises determining that a difference between the further copy of the data set and the data set is within a threshold for acceptable data loss at the further copy upon a failure of the data set, wherein the threshold for acceptable data loss at the further copy is the same as the threshold for acceptable data loss at the one or more copies.

9. The method of claim 5, further comprising receiving a request, via an interface for a data store that hosts the data set, that specifies a maximum data loss threshold from which the threshold is determined and enables enforcement of the threshold with respect to the one or more copies.

10. The method of claim 5, wherein the updates to the data set are replicated to a further copy that mirrors the data set, and wherein the method comprises excluding an evaluation of a difference between the further copy of the data set and the data set from determining whether to apply the data loss mitigation action.

11. The method of claim 5, wherein determining that the difference between the one or more copies of the data set and the data set fails to satisfy the threshold for acceptable data loss at the one or more copies of the data set upon a failure of the data set comprises:
   determining the difference between a first timestamp generated by a data store for the data set that is associated with a logical sequence number associated with a prior update committed to the data set and a second timestamp associated with receipt of an indication that the one or more copies include the prior update at the data store.

12. The method of claim 5, wherein the updates to the data set are replicated to a further copy that mirrors the data set, and wherein the method comprises determining that a difference between the further copy of the data set and the data set fails to satisfy a threshold for acceptable data loss at the further copy upon a failure of the data set, wherein the threshold for acceptable data loss at the further copy is different than the threshold for acceptable data loss at the one or more copies, and wherein the applying the data loss mitigation action to the update is further performed in response to determining that the difference between the further copy of the data set and the data set fails to satisfy the threshold for acceptable data loss at the further copy.

13. One or more non-transitory, computer-readable storage media, storing program instructions that when executed on or across one or more computing devices cause the one or more computing devices to implement:
receiving an update to a data set, wherein updates to the data set are replicated to one or more copies that mirror the data set;
evaluating a threshold for acceptable data loss at the copy of the data set upon a failure of the data set to determine that a difference between the one or more copies of the data set and the data set fails to satisfy the threshold;
responsive to the determining that the difference fails to satisfy the threshold, applying a data loss mitigation action to the update to the data set; and
receiving a request, subsequent to applying the data loss mitigation action via an interface for a data store that hosts the data set, that disables enforcement of the threshold with respect to at least one of the one or more copies.

14. The one or more non-transitory, computer-readable storage media of claim 13, wherein the one or more non-transitory, computer-readable storage media comprise further program instructions that when executed by the one or more computing devices cause the one or more computing devices to further implement:
after applying the data loss mitigation action, determining that an updated difference between the one or more copies of the data set and the data set satisfies the threshold; and
responsive to determining that the updated difference between the one or more copies of the data set and the data set satisfies the threshold, performing the update to the data set.

15. The one or more non-transitory, computer-readable storage media of claim 13, wherein the one or more non-transitory, computer-readable storage media comprise further program instructions that when executed by the one or more computing devices cause the one or more computing devices to further implement:
sending an indication of the difference failing to satisfy the threshold to a specified recipient.

16. The one or more non-transitory, computer-readable storage media of claim 13, wherein the one or more non-transitory, computer-readable storage media comprise further program instructions that when executed by the one or more computing devices cause the one or more computing devices to further implement receiving a request, via an interface for a data store that hosts the data set, that specifies a maximum data loss threshold that is the threshold and enables enforcement of the threshold with respect to the one or more copies.

17. The one or more non-transitory, computer-readable storage media of claim 13, wherein updates to the data set are replicated to a plurality of copies including the one or more copies, and wherein the one or more non-transitory, computer-readable storage media comprise further program instructions that when executed by the one or more computing devices cause the one or more computing devices to further implement:
determining that a minimum number of the plurality of copies fail to satisfy the threshold;
wherein the applying the data loss mitigation action is further performed in response to the determining that the minimum number of the plurality of copies fail to satisfy the threshold.

18. The one or more non-transitory, computer-readable storage media of claim 13, wherein, in applying the data loss mitigation action to the update, the program instructions cause the one or more computing devices to implement:
blocking performance of the update; or
delaying performance of the update.

19. The one or more non-transitory, computer-readable storage media of claim 13, wherein the data set hosted by a network-based service that is implemented as part of a provider network that offers different provider network regions, wherein the one or more copies of the data set are located in a different respective provider network region than the data set, wherein the updates to the one or more copies are replicated via a wide area network that connects the different respective provider network regions.

\* \* \* \* \*